Dec. 31, 1935.  L. RICEFIELD  2,025,829
COUPLING
Original Filed March 21, 1935  2 Sheets-Sheet 1
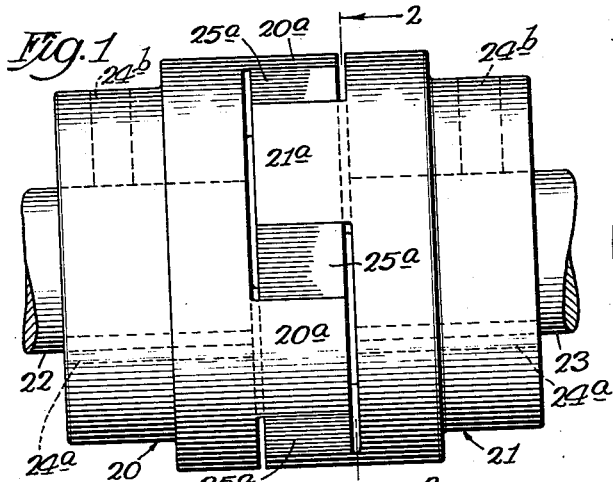
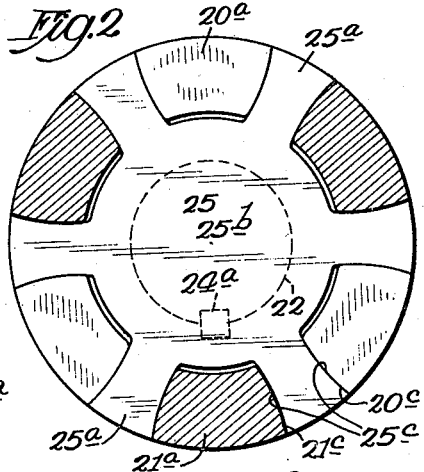
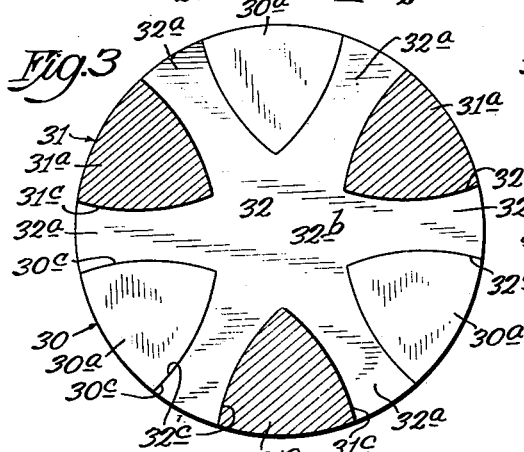
Inventor
Louis Ricefield
By Davis, Macauley, May, Lindsey & Smith Attys.

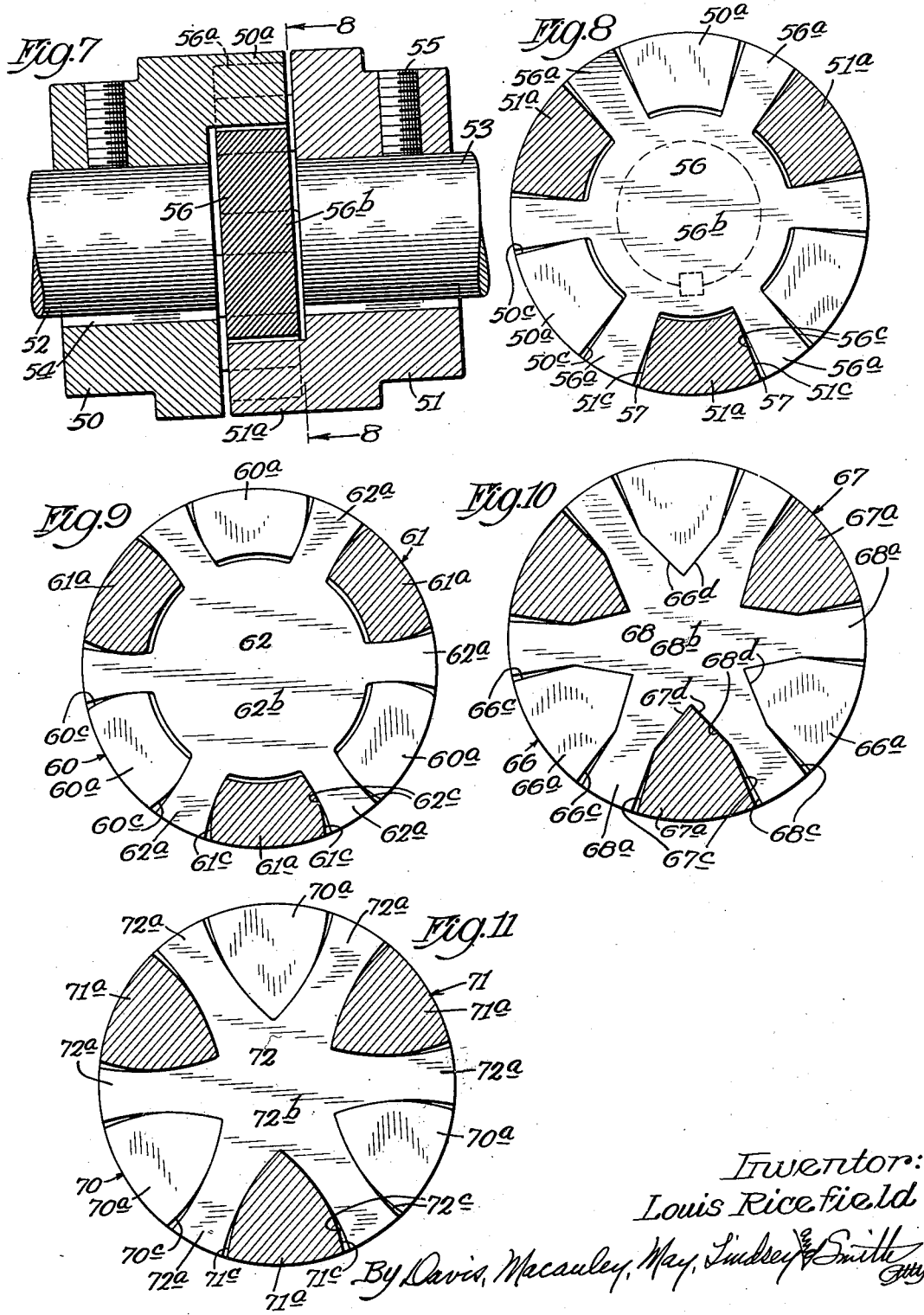

Patented Dec. 31, 1935

2,025,829

UNITED STATES PATENT OFFICE 2,025,829

COUPLING

Louis Ricefield, Oak Park, Ill.

Original application March 21, 1935, Serial No. 12,226. Divided and this application November 11, 1935, Serial No. 49,169

14 Claims. (Cl. 64—14)

This invention relates to improvements in couplings for connecting substantially aligned rotatable shafts in order to compensate for angular misalignment of the shafts, or relative lateral displacement thereof, or to permit relative endwise movement. The present application is a division of my copending application Serial No. 12,226, filed March 21, 1935. The invention disclosed herein relates particularly to that type of coupling in which a pair of metallic coupling members are fixed on substantially aligned shafts and have a plurality of lugs or jaws extending endwise therefrom and intermeshing loosely with each other, in combination with a power transmitting member or spider interposed between the coupling members and having radiating resilient arms of compressible material each extending between and contacting with the faces of two of the lugs or jaws carried by opposite coupling members. In the copending application above referred to, there are described and claimed several forms of a coupling of this general type in which the power transmitting arms or cushions of the spider are so formed and proportioned as to cause equal compressive stresses to be set up in different parts of each spider arm when power is transmitted from one shaft to the other with the result that the wear is substantially uniform over all parts of each spider arm or cushion, thereby eliminating radially acting forces tending to distort the spider arm or to effect relative movement of the parts thereof and increasing the life of the spider as compared with spiders of the form heretofore used. These desirable results are preferably obtained with the use of a coupling wherein the contacting faces of the jaws and the spider arms are so inclined with respect to the radial axis of each spider arm that the inclination does not exceed the angle of friction of the materials used in the construction of the contacting surfaces of the coupling members and the spider, thus eliminating the tendency of the layers of the spider arms to move upon each other and also the tendency of the spider arm as a whole to move radially in either direction.

It has been found that couplings having many of the structural features of the couplings claimed in the aforesaid copending application may be employed with advantage in many circumstances and locations where the form and proportions of the spider arms and their coacting jaws may not be such as to give rise to uniform compressive stresses in every part of each spider arm which is under compression, and the principal object of the present invention is, therefore, to provide an improved coupling of the type referred to in which the advantages of simplicity, ease of manufacture, elimination of radial stresses in the spider arms, durability and the like may be obtained with the use of spider arms each having opposite jaw-engaging faces which are curved and diverge outwardly, or which diverge in opposite radial directions from an intermediate point, or which are so formed as to have a progressive contact with adjacent jaw faces as the power transmitted through the spider increases. A further object is to provide a coupling embodying one or more of the structural features just referred to in combination with a divergence either radially outward or radially inward of the end faces of each spider arm between the adjacent jaws engaged by that spider arm. Other objects relate to various features of construction and arrangement which will appear more fully hereinafter.

The nature of the invention will be understood from the following specification taken with the accompanying drawings, in which several embodiments are illustrated. In the drawings, Figure 1 shows a side elevation of an improved coupling embodying the features of the present invention;

Fig. 2 shows a transverse section taken on the line 2—2 of Fig. 1;

Fig. 3 is a sectional view similar to that of Fig. 2, showing a modified form of the construction illustrated in Figs. 1 and 2, in which the curved faces of the lugs or jaws and the spider arms are extended inwardly so that the inner portions of these surfaces on each spider arm diverge inwardly while the outer portions all diverge outwardly;

Fig. 4 is a sectional view similar to that of Fig. 2, showing a modified form of construction which is similar to that shown in Fig. 3 but differs therefrom in the fact that the contacting faces of the lugs or jaws and the spider arm are formed as flat surfaces which diverge both inwardly and outwardly from an intermediate part of each spider arm;

Fig. 5 is a longitudinal axial section through a coupling, such as that shown in Fig. 1, for example, illustrating the use of spider arms which have a progressively decreasing thickness longitudinally of the shafts as the distance from the axes of the shafts increases;

Fig. 6 is a sectional view similar to that of Fig. 5, showing a modification of any of the couplings illustrated in the drawings, according to which the thickness of each spider arm measured longitudinally of the shafts increases progressively from its inner end outwardly;

Fig. 7 shows a longitudinal axial section through another form of construction in which the opposite lug-engaging faces of each spider arm diverge outwardly as plane surfaces that are adapted to have a progressively increasing contact with the adjacent faces of the lugs or jaws of the coupling members as the force transmitted to the coupling increases;

Fig. 8 is a sectional view taken on the line 8—8 of Fig. 7;

Fig. 9 is a sectional view similar to that of Fig. 8, showing a modified form of the construction illustrated in Fig. 2, whereby there is a progressively increasing contact of the opposite faces of each spider arm with the adjacent surfaces of the lugs or jaws as the force transmitted to the coupling increases;

Fig. 10 is a sectional view similar to that of Fig. 8, showing a modification of the structure illustrated in Fig. 4, wherein the opposite faces of each spider arm are adapted to have a progressively increasing contact with the adjacent surfaces of the lugs or jaws as the power transmitted increases; and Fig. 11 is a sectional view similar to that of Fig. 8, showing a modification of the structure illustrated in Fig. 3, whereby there is a progressively increasing contact of each spider arm with the jaw faces as the power transmitted to the coupling increases.

The form of invention illustrated in Figs. 1 and 2 comprises a pair of similar coupling members 20 21 which are secured upon a pair of substantially aligned shafts 22 and 23, respectively, by means of keys 24ª and set screws 24ᵇ. The coupling member 20 comprises a disc extending transversely to the shaft 22 and having a plurality of lugs or jaws 28 projecting longitudinally therefrom toward the other coupling member and intermeshing loosely with a plurality of similar lugs or jaws 21ª which are formed on the disc of the other coupling member. Interposed between the two coupling members 20 and 21 and between the ends of the two shafts 22 and 23, there is a power transmitting member 25 in the form of a spider comprising a plurality of arms 25ª radiating from a central hub 25ᵇ and each provided on opposite sides with outwardly diverging curved faces 25ᶜ which are adapted to contact directly with the similarly curved faces 20ᶜ and 21ᶜ which are carried by the jaws of the opposite coupling members, so that when power is transmitted from one coupling member to the other, the spider arms 25ª are compressed by the relative angular movement of the coupling members 20 and 21.

The spider 25 may be formed of leather, probably of a laminated structure, or of connected layers of duck or other textile fabric impregnated with rubber, or of other suitable compressible and resilient material adapted to yield under the forces transmitted through the coupling and also adapted to have a long life. This form of construction is, however, particularly adapted for use where the spider is constructed of rubber and rubberized fabric, which offer less resistance to an initial compression of a given amount than they do to a subsequent further compression of the same amount after they are partly compressed and which also have the property that their compressibility increases with increase in thickness at a more rapid rate than in the case of leather, for example. By increasing the divergence of the faces of the spider arm and of the jaw faces more rapidly than would be desirable in the event that leather were employed, it is possible to obtain a more or less uniform wear upon the spider arm and an increase in the life of the spider without necessarily obtaining the uniform stresses and a longer life which are brought about by utilizing the invention described and claimed in the aforesaid copending application. The angle of contact between a spider arm and the contacting surfaces of the lugs or jaws at any point should preferably be less than the angle of friction for the materials which are employed in forming the jaws and the spider arms, so that the outwardly acting radial component of the force transmitted to the spider arm will not tend to project the spider arm outwardly.

In Fig. 3 there is illustrated an extension of the idea embodied in the construction shown in Fig. 2, involving the projection of the jaws and the spider arms inwardly to a greater extent, so that portions of the spider arms have opposite curved surfaces diverging inwardly, while other portions have opposite curved surfaces diverging outwardly from intermediate parts of the spider arms. In this form, there are two coupling members 30 and 31, secured upon two substantially aligned shafts as in the forms of the invention previously described, and provided, respectively, with longitudinally extending lugs or jaws 30ª and 31ª which intermesh loosely with each other and which are adapted to receive between them the radiating arms 32ª of the spider 32. In this case, the hub 32ᵇ of the spider is of lesser area than the hub shown in Fig. 2 and the spider arms 32ª are of correspondingly greater length. The spider arms have opposite curved faces 32ᵇ which are adapted to contact with the corresponding side faces 30ᶜ and 31ᶜ of the lugs or jaws. The surfaces 33 on each jaw 30ª are extended inwardly to the point where they intersect and the same arrangement is followed with the surfaces 31ᶜ of the jaws 31ª. The contacting surfaces of the spider arms 32ª are of similar extent and the arrangement is such that the opposite sides of the outer portion of each spider arm diverge outwardly while the opposite sides of the inner portion of each spider arm diverge inwardly. When forces are transmitted through the spider arms from one coupling member to the other, this opposite divergence of the curved surfaces at opposite ends of the spider arms is adapted to set up radial components of the forces transmitted which are adapted to neutralize each other so that there is no tendency of the spider arms to be projected radially in either direction or to have the component parts thereof separated due to the action of these radial forces.

The spider 32 may be constructed of any of the materials which have been referred to in connection with the form of construction illustrated in Fig. 2, but the form of construction of Fig. 3 is particularly adapted for use with spiders made of rubber or rubberized fabric, and the like, due to the variation in the range of compressibility of these materials as the degree of compression increases.

The form of construction illustrated in Fig. 4 has the advantages of the form of construction shown in Fig. 3 in that the oppositely diverging faces of the spider arms may be so arranged that radially acting components of forces set up by the transmission of power through the coupling neutralize each other, or tend to neutralize each other, in each spider arm. In this form, the two coupling members 40 and 41 are provided with intermeshing jaws 40ª and 41ª adapted to contact with the radiating arms 42ª which project outwardly from the hub 42ᵇ of the spider 42. This spider may be formed of any of the materials heretofore referred to in connection with the spider 25 and the spider arms have a considerable radial length corresponding to the length of the spider arms shown in Fig. 3. The construction differs from that of Fig. 3 in that each spider arm is provided on opposite sides with angularly disposed flat surfaces instead of the curved surfaces formed on the spider arms 32ª. Each spider arm 42ª is provided with angularly disposed surfaces 42ᶜ and 42ᵈ which are adapted to coact with corresponding angularly disposed surfaces formed on the sides of the lugs or jaws 40ª and 41ª. Each lug or jaw 40ª has two side faces each composed of an outer portion 40ᶜ and an inner portion 40ᵈ adapted to coact with corresponding faces 42ᶜ and 42ᵈ, respectively, on adjacent spider arms, and each lug or jaw 41ª is similarly provided with two side faces each composed of parts 41ᶜ and 41ᵈ, which are adapted to coact with two of the spider arm surfaces 42ᶜ and 42ᵈ, respectively. With this arrangement, each spider arm has its outer portion provided with opposite lug-engaging faces which diverge outwardly and an inner portion provided with opposite lug-engaging faces which diverge inwardly from an intermediate point where the spider arm is of minimum thickness.

In connection with any of the forms of construction illustrated, including those hereinafter described, the width of the spider arm, measured longitudinally of the shafts, may be varied in combination with any of these forms of divergence of the lug-engaging faces for the purpose of regulating the life of the spider arms or to obtain the advantages which are referred to in said copending application. Two examples of this variation of the width of the spider arms are shown in Figures 5 and 6 and either of these figures may be regarded as a longitudinal section taken through any of the couplings illustrated in the other figures of the drawings, illustrating the application thereto of the idea of tapering the sides of the spider arms in a radial direction. In Fig. 5, the two coupling members 44 and 45 are secured upon a pair of substantially aligned shafts 44ᵇ and 45ᵇ, respectively, by means of keys 43 and set screws 43ª. These coupling members have intermeshing lugs or jaws 44ª and 45ª, respectively, which intermesh loosely with each other and which receive between them the radiating arm 46ª of a power transmitting spider 46, which is constructed of resilient compressible materials as heretofore described and which has its radiating arms tapered so that their lateral end faces 46ᵇ converge outwardly from the hub of the spider. In Fig. 6, the two coupling members 47 and 48 are secured upon a pair of substantially aligned shafts 47ᵇ and 48ᵇ by means of keys and set screws, as in the forms of construction heretofore described, and these coupling members have mounted between them a power transmitting spider 49 formed of resilient compressible material and embodying a plurality of radiating arms 49ª which intermesh loosely with the lugs or jaws 41ª and 48ª which are carried by the coupling members 47 and 48, respectively. The lateral sides 49ᶜ of the spider arms diverge outwardly from the hub 49ᵇ of the spider so that there is a gradually increasing volume of material to be compressed as the outer end of the spider arm is approached.

In any of the forms of the present invention, it may be found desirable to cause a gradually increasing portion of each spider arm to be put under compression between opposing jaws of the coupling members as the load transmitted to the coupling increases, in order to distribute the wear upon the spider arms in a desired manner and thereby increase the life of the spider. In Figs. 7 and 8 of the drawings, this improvement is shown applied to a form of coupling similar to that illustrated in Figs. 1 and 2 except that the outwardly diverging lug-engaging faces of the spider arms are plane instead of curved. In this modification, two coupling members 50 and 51 are secured upon a pair of substantially aligned shafts 52 and 53, respectively, by means of keys 54 and set screws 55. The coupling member 50 has longitudinally extending lugs or jaws 50ª which intermesh loosely with the similar lugs or jaws 51ª carried by the other coupling member 51, and these lugs or jaws are adapted to receive between them the radiating arm 56ª of a spider 56 having a hub 56ᵇ located between the ends of the shafts 52 and 53. The spider arms 56ª are provided on their opposite sides with outwardly diverging flat surfaces 56ᶜ which are adapted to coact with the outer surfaces 50ᶜ and 51ᶜ formed on the lugs or jaws 50ª and 51ª, respectively. When there is no load on the coupling, the surfaces 56ᶜ contact with only the inner portions of the surfaces 50ᶜ and 51ᶜ and, from these inner areas of contact, these surfaces diverge outwardly as shown at 57 in Fig. 8. When a load is transmitted through the coupling, the spider arms are compressed between the lugs or jaws of the coupling members and the area of contact of the surfaces 56ᶜ with the surfaces 50ᶜ and 51ᶜ increases gradually with the increase in load until, finally, all of the surfaces may be in contact throughout the radial extent of the spider arms. As in the constructions previously described, it is desirable to maintain the angle of divergence of the spider arms and of the opposed coupling jaws such that when the spider arms and the jaws are in contact, the angle which is made with the radial axis of the spider arms will not exceed the angle of friction for the materials which are employed in the construction of the spider and the coupling.

In Fig. 9, the improvement last referred to has been applied to the form of construction shown in Fig. 2. In this modification, the coupling members 60 and 61 are provided with longitudinally extending lugs or jaws 60ª and 61ª, respectively, which intermesh loosely with each other and which receive between them the radiating arms 62ª of the spider 62, which has a hub 62ᵇ located between the ends of the shaft to which the coupling members are secured. In this case, the opposite surfaces 62ᶜ of the spider arm are curved and diverge outwardly from their inner ends where they are united with the hub, but they diverge gradually from the adjacent surfaces 60ᶜ and 61ᶜ of the coupling jaws with which they are adapted to contact, so that when there is no load on the coupling, the surfaces of the spider arms and jaws contact only adjacent their inner extremities. As the load transmitted through the coupling increases, the area of contact of the spider arm with the jaws also increases until finally the entire areas of these surfaces may be in contact. In this form, also, it is desirable to maintain the angle of inclination of the contacting surfaces within the angle of friction determined by the materials employed.

In Fig. 10, the feature of gradually increasing the area of contact of the spider arm and coupling jaws is illustrated in connection with the coupling shown in Fig. 4. In this modification, a pair of coupling members 66 and 67 are provided with longitudinally extending jaws 66ª and 67ª, respectively, which intermesh loosely with each other and which receive between them the radiating arms 68ª of the spider 68, which has a central hub 68ᵇ located between the ends of the shaft to which the coupling members are secured. In this case, each spider arm 68ª is provided with lateral surfaces comprising outer portions 68ᶜ which diverge outwardly and inner portions 68ᵈ which diverge inwardly from the intermediate part of the spider arm. The jaws 68ª are provided toward their outer ends with lateral outwardly diverging surfaces 66ᶜ adapted to contact with the surfaces 68ᶜ of the spider arms and the jaws 67ª are similarly provided with outwardly diverging surfaces 67ᶜ which are adapted to contact with the surfaces 68ᶜ of the spider arms. The jaws 66ª and 67ª are provided inwardly of the surfaces 66ᶜ and 67ᶜ, respectively, with inwardly diverging surfaces 66ᵈ and 67ᵈ which are adapted to contact with the surfaces 68ᵈ of the spider arms and which do contact with the surfaces when the parts of the coupling are assembled. When there is no load on the coupling, the surfaces 68ᵈ of the spider arms are the only ones which engage the side faces of the lugs or jaws on the coupling members, but as the load transmitted through the coupling increases, the divergence of the surfaces 68ᵇ from the surfaces 66ᶜ and 67ᶜ decreases so that there is a gradually increasing area of contact until, finally, the entire areas of the surfaces 68ᶜ may contact with the faces of the jaws, thus compensating for variations in the compressibility of the material of the spider arms with variations in load.

In Fig. 11 there is shown a modification in which the idea of providing an initial divergence of portions of the side faces of the spider arms and of the adjacent faces of the lugs or jaws on the coupling members is embodied in a coupling of the type illustrated in Fig. 3. In this modification, the two coupling members 70 and 71 are provided with lugs or jaws 70ª and 71ª, respectively, which intermesh loosely with each other and which receive between them the radiating arms 72ª of the spider 72, which has a central hub 72ᵇ located between the ends of the shaft upon which the coupling members 70 and 71 are secured. In this construction, the curved side faces 72ᶜ of the spider arms are adapted to contact with the curved side faces 70ᶜ and 71ᶜ of the lugs or jaws carried by the coupling members. The curvature of the surfaces 72ᶜ is slightly greater than that of the surfaces 70ᶜ and 71ᶜ so that these surfaces diverge from each other adjacent their outer extremities. This divergence is adapted to be diminished as the load transmitted through the coupling increases.

The spiders of any of the couplings described above may be constructed of the materials which were mentioned in connection with the form illustrated in Figs. 1 and 2 and, although it is not essential in order to obtain many of the advantages of the present invention, it is preferable that the contacting surfaces of the spider arms and jaws be so formed that their inclination to the radial center line of the spider arms will be less than the angle of friction for the materials employed. As is well known, the angle of friction varies for different materials and it may be determined by reference to standard references or by actual tests of the materials to be employed. For example, where leather is in contact with metal, in a dry condition, the angle of friction varies from 29.5 degrees to 31 degrees; when rubberized duck contacts with metal in a dry condition, the angle of friction has been found to be about 30 degrees; for rubberized asbestos when engaging metal, the angle of friction is about 31 degrees; and when vulcanized rubber engages metal in a dry condition, the angle of friction is about 25 degrees.

Although certain forms of the invention have been shown and described by way of illustration, it will be understood that the invention may be constructed in various other embodiments coming within the scope of the appended claims.

I claim:

1. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms having parts of resilient compressible material provided with jaw engaging faces which diverge outwardly along curved lines.

2. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms having parts of resilient compressible material provided with jaw engaging faces which diverge outwardly along curved lines, the angle of divergence of said surfaces on each spider arm with respect to a radius of the coupling being within the angle of friction for the materials employed in the construction of said spider arms and said jaws.

3. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms having opposite jaw engaging faces which diverge both inwardly and outwardly from an intermediate part of the spider arm to contact with similar inclined surfaces formed on the adjacent jaws.

4. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms having opposite jaw engaging faces which diverge both inwardly and outwardly from an intermediate part of the spider arm to contact with similar inclined surfaces formed on the adjacent jaws, the angle of divergence of said surfaces on each spider arm with respect to a radius of the coupling being within the angle of friction determined by the contacting parts of the spider arm and the adjacent jaws.

5. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms and the contacting jaws having coacting parts which diverge inwardly and outwardly along curved surfaces from an intermediate part of the spider arm.

6. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms and the contacting jaws having coacting parts which diverge inwardly and outwardly along curved surfaces from an intermediate part of the spider arm, the angle of divergence of the surfaces of each spider arm with respect to a radius of the coupling being within the angle of friction determined by the materials of the contacting parts of the spider arm and jaws.

7. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms of resilient material each interposed between and contacting with two of said jaws carried by opposite coupling members, each spider arm and the contacting jaws having coacting surfaces which diverge outwardly along curved lines, each spider arm also having end surfaces between the coacting jaws which converge radially of the spider.

8. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and adapted to contact with two of said jaws carried by opposite coupling members, each of said spider arms having opposite outwardly diverging surfaces adapted to contact with oppositely disposed diverging surfaces formed on two adjacent jaws, said surfaces of each spider arm contacting initially on their inner portions only with said surfaces of said jaws but being adapted to increase their areas of contact as the force transmitted from one coupling member to the other increases.

9. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and adapted to contact with two of said jaws carried by opposite coupling members, each of said spider arms having opposite faces adapted to contact with adjacent faces of two of said jaws, each of said faces of each spider arm and the adjacent face of one of said jaws diverging from their inner portions outwardly when there is no load on the coupling.

10. The combination in a coupling for connecting substantial aligned shafts, of a pair of coupling members each adapted to be secured upon one of said shafts and having longitudinally extending jaws adapted to intermesh loosely with each other, and a power transmitting spider having radiating resilient arms each interposed between and adapted to contact with two of said jaws carried by opposite coupling members, each of said spider arms and said jaws adapted to contact therewith having outwardly diverging surfaces adapted to contact with each other, the faces of said jaws having a greater degree of divergence than the faces of each spider arm with which they are adapted to contact.

11. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and adapted to contact with two of said jaws carried by opposite coupling members, each of said spider arms having opposite inwardly diverging surfaces adapted to contact continuously with adjacent faces of two of said jaws and having other outwardly diverging surfaces adapted to diverge from adjacent faces of two of said jaws when there is no load on the coupling.

12. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and contacting with two of said jaws carried by opposite coupling members, each of said spider arms having a surface adapted to contact with an adjacent surface of one of said jaws but having an initial divergence from said surface of said jaw.

13. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and contacting with two of said jaws carried by opposite coupling members, each of said spider arms having a curved surface diverging away from the opposite side thereof and adapted to contact with a similar curved surface formed on an adjacent jaw of one of said coupling members.

14. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and contacting with two of said jaws carried by opposite coupling members, each of said spider arms having opposite surfaces adapted to contact with adjacent jaws and diverging away from the inner portion of the spider arm in such a manner that intermediate portions of opposite jaws are closer to each other than portions thereof which engage the end portions of the spider arm.

LOUIS RICEFIELD.